Dec. 31, 1935.  E. E. LINDSEY  2,025,757
FROZEN CONFECTION AND METHOD OF MAKING
Filed Feb. 15, 1933  2 Sheets-Sheet 1
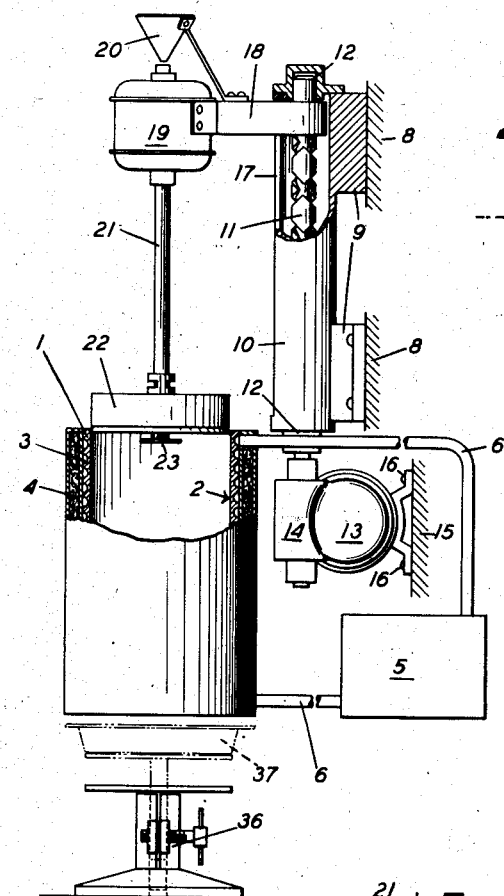
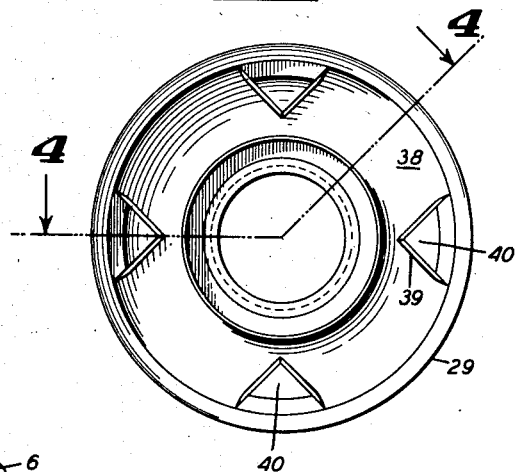
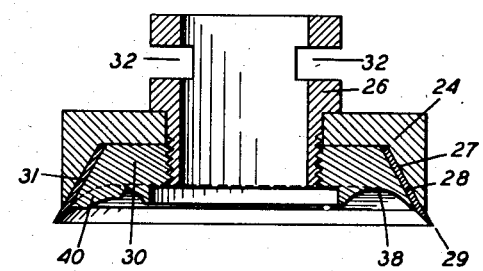
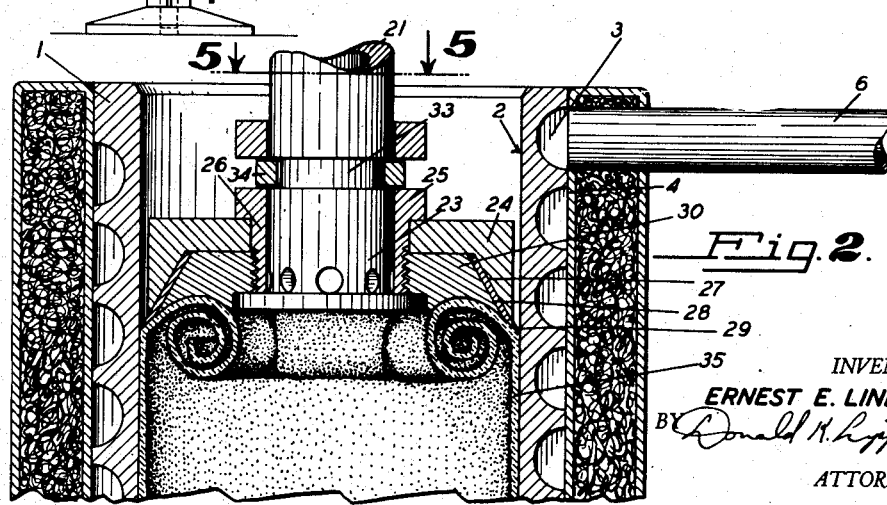
INVENTOR,
ERNEST E. LINDSEY.
BY Donald K. Lippincott
ATTORNEY Dec. 31, 1935. E. E. LINDSEY 2,025,757
FROZEN CONFECTION AND METHOD OF MAKING
Filed Feb. 15, 1933 2 Sheets-Sheet 2
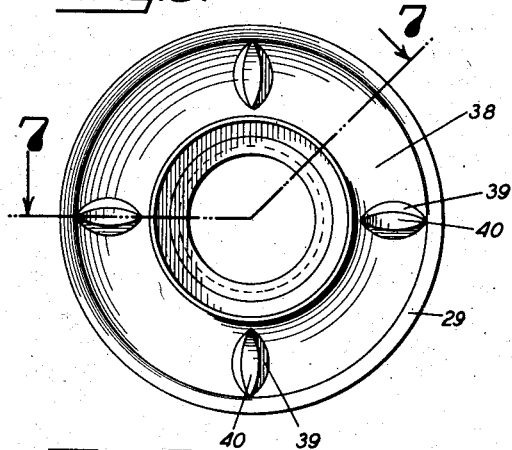
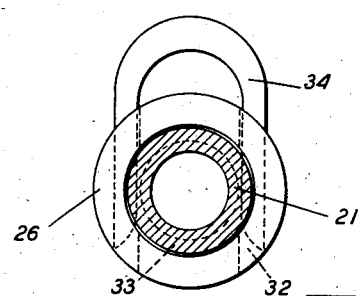
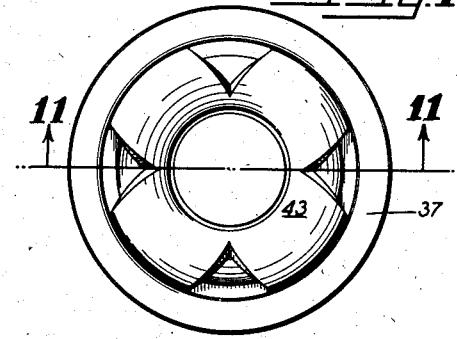
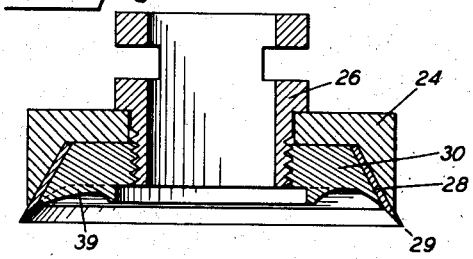
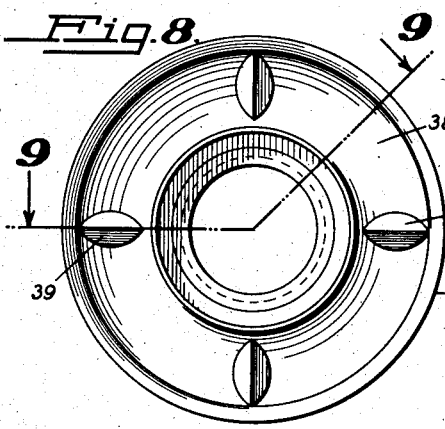
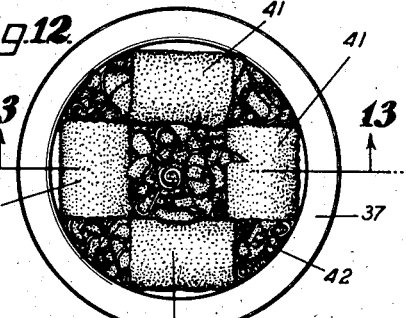
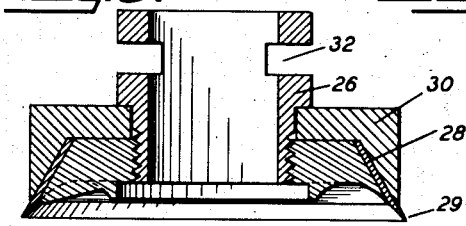
INVENTOR,
ERNEST E. LINDSEY.
BY
ATTORNEY.

Patented Dec. 31, 1935

2,025,757

UNITED STATES PATENT OFFICE 2,025,757

FROZEN CONFECTION AND METHOD OF MAKING

Ernest E. Lindsey, San Francisco, Calif.

Application February 15, 1933, Serial No. 656,769

23 Claims. (Cl. 62—114)

This application is an improvement on the device which is the subject matter of my application, Serial No. 629,532, filed August 19, 1932.

My invention relates to a device for, and method of, making a frozen confection whereby such confections are prepared for use almost instantly, the confections being characterized by an exceptionally small grain size, and unique appearance.

Among the objects of my invention are: To provide a frozen confection formed by freezing atomized particles of a confection mixture; to provide a device for quick freezing a confection in the form of a layer, the device delivering the confection in the form of a cylindrical roll; to provide a means of peeling a frozen layer of confection from a cylinder, which will deliver the frozen confection in the form of a symmetrical attractive serving; to provide a means of peeling a frozen layer of confection from a cylinder, which will deliver the frozen confection in moulded form; to provide a means for serving a quickly frozen confection in form attractive to the eye as well as taste; to provide a method of forming a mass of frozen confection, said confection being frozen in a thin sheet; and to provide a new and unique frozen confection.

Other objects of my invention will be apparent or will be specifically pointed out in the description forming a part of this specification, but I do not limit myself to the embodiment of my invention herein described, as various forms may be adopted within the scope of the claims.

In broad terms, my invention comprises a surface which is cooled below the freezing point of the confection mixture. The mixture is deposited on this cooled surface in a fine spray to form a flexible layer. The sprayed particles, freezing on impact, can produce ice crystals no larger than themselves, and the resultant deposit is flexible and plastic even at extremely low temperature, and is extremely smoooth to the taste. I then prefer to peel the layer from the surface by inserting a cutting edge between the layer and the cooled surface and pushing the edge along the surface. I prefer to cause the peeled-off strip of confection to be directed into a roll, by being wrapped upon itself in the form, or nearly the form, of a cylinder, in which the convolutions are non-adherent. I may serve the confection in roll form, or I may compress the roll into a moulded shape. In case I deposit the sheet in the form of an open cylinder of frozen material on the inner surface of a cooled sleeve, I prefer to push a piston having a circular cutting edge through the sleeve to remove the deposit and shape the piston to split the frozen sheet into longitudinal strips. I may cause each of these strips to form a separate roll, or I may split the frozen cylinder into both wide and narrow strips, forming the wider strips into rolls, the remainder of the strips being directed so that they will not interfere with the roll formation. I prefer to use the last portion of the piston travel to compress the removed material against a delivery container to mould the material into a shape determined by the face of the piston, in case a moulded product is desired. While my apparatus and method is described as relating to an individual service, it is obvious that a single rolled or moulded service can be made which is large enough to serve several people.

Referring to the drawings which illustrate a preferred portable embodiment of my invention adapted to produce a quickly frozen individual portion of confection:

Figure 1 is a side view, partly in section and partly in elevation, of the device as fastened to a wall or other support.

Figure 2 is a longitudinal sectional view showing the deposit in course of being peeled from the sleeve walls, and formed into rolls.

Figure 3 is a lower face view of one form of piston.

Figure 4 is a sectional view of the piston illustrated in Figure 3 taken along a plane indicated by the line 4—4 in Figure 3.

Figure 5 is a view partly in section and partly in elevation of a preferred means for locking the piston to the motor shaft.

Figure 6 is a lower face view of another form of piston.

Figure 7 is a sectional view of the piston shown in Figure 6, taken as indicated by the line 7—7 in Figure 6.

Figure 8 is a lower face view of still another form of piston.

Figure 9 is a sectional view of the piston shown in Figure 8, taken as indicated by the line 9—9 in Figure 8.

Figure 10 is a plan view of the confection as formed by pressure between the piston of Figure 3 and the serving dish.

Figure 11 is a sectional view of the moulded confection, taken as indicated by the line 11—11 of Figure 10.

Figure 12 is a plan view of the rolled confection as delivered by a piston without being moulded after delivery.

Figure 13 is a sectional view of the unmoulded confection, taken as indicated by the line 13—13 in Figure 12.

In my former application, identified above, I described a device for quick freezing a layer of confection on a pre-cooled surface, the device peeling the layer from the surface. I now wish to describe a means for, and method of, peeling the layer from the surface to form definite patterns, either in roll form alone, or first rolled and thereafter moulded.

In Figure 1 a metal sleeve 1 is provided with a smooth inner surface 2 and an outer spiral thread 3. This thread is covered with a shrunk-on sleeve 4 so that a tight brine channel is formed which may be connected to the circulating system of a refrigerator 5 by pipes 6—6. I cover the outer surface of the cylinder with a layer of insulation to prevent temperature losses.

Fastened to a wall 8 by brackets 9—9 is oscillating drive cylinder 10 containing a double threaded shaft 11 held by bearings 12—12 and driven by an oscillator motor 13 through a reduction gear 14. The motor is fastened to a support 15 by screws 16.

The drive cylinder is provided with a longitudinal slot 17 through which passes a sprayer bracket 18 carrying a spray motor 19 and a funnel 20. The spray motor has a hollow shaft 21 opening on top directly under the funnel, and extending downwardly through a piston 22 to terminate in a spray nozzle 23. A cam (not shown) enters the threads on the shaft and causes the bracket 18 to reciprocate in the longitudinal slot 17.

The nozzle is positioned coaxially within the cylinder, and is so disposed that when the sprayer bracket is at the top of its stroke on the double threaded shaft, the nozzle is at the top of the cylinder. The length of the stroke of the bracket is also equal to the length of the cylinder, so that when the oscillator motor 13 is rotated the nozzle traverses substantially the entire length of the cylinder.

Under normal conditions the shaft passes freely through the piston which rests near the top of the cylinder until needed.

The pistons, which are shown in Figures 2, 4, 7 and 9, differ only in the configuration of their lower surfaces, as will be described later.

A piston body 24 somewhat smaller in diameter than the sleeve 1, is centrally bored and placed against a shoulder 25 of a piston bearing 26, loosely fitting the shaft 21. This bearing is mounted between the motor and the nozzle. The piston body is provided with a taper surface 27 against which is placed a truncated conical cutter 28 having a sharpened edge 29 extending to the wall of the metal sleeve 1 and adapted to peel a frozen deposit from the metal sleeve. The cutter is held firmly in place by a piston face nut 30 screwed to the piston bearing, and has an exterior tapered face 31 cooperating with the taper surface 27 on the piston body to clamp the cutter. I prefer to make the cutter from a semi-flexible non-metallic material such as celluloid. The sharpened edge 29, extending as it does somewhat beyond the piston, and being flexible, makes firm contact with the metal sleeve wall when pushed against the frozen layer.

The upper portion of the piston bearing is cut away on each side to form lock grooves 32. The piston bearing and the piston face nut are recessed below to receive the spray nozzle 23 so that the bottom face of the spray nozzle completes the bottom surface of the piston. When the nozzle is firmly seated in the piston recess, a shaft groove ring 33 is cut into the piston in the same plane as the lock grooves 32 in the piston bearing, and the shaft and the piston may then be locked together by inserting the locking pin 34 in the grooves, as shown in Figure 4. Operation of the oscillator motor then causes the piston to traverse the metal sleeve and remove a frozen confection layer from the inner walls.

This frozen confection layer is laid down on the inner wall of the sleeve, as described in my former application referred to above. The unfrozen confection mixture is poured into the funnel 20 and both motors are started. The confection mixture runs down through the hollow shaft 21 and is atomized into an exceedingly fine spray or fog by the nozzle 23. I prefer to revolve the nozzle from 4,000–6,000 R. P. M. The surface 2 of the cylinder having been cooled by the refrigerator 5 below the freezing point of the mixture, receives the atomized particles, which freeze substantially on impact, thus preventing ice crystal growth or formation between the atomized particles. The oscillator motor 13 acting through the reciprocating drive, causes the nozzle 23 to traverse the cylinder while spraying, thus laying down superimposed layers of frozen particles, each layer being adherent, but having no crystal interlock between them. In this way a substantial sheet 35 of frozen confection is deposited on the inner surface 2 of the cylinder. This sheet is flexible and plastic and is, in this case, in the shape of an open cylindrical sheet of frozen material.

When all of the confection mixture has been deposited and frozen, both motors are stopped. An adjustable receptacle support 36 is provided at the bottom of the cylinder, upon which a service receptacle 37 may be placed, and its distance from the cylinder adjusted. The receptacle is positioned, its relation to the cylinder fixed, and the piston 22 and shaft 21 are locked together by the insertion of the locking pin 34 in the grooves provided. The oscillator motor only is then started and the piston 22 is pushed through the cylinder by the reciprocating mechanism, thereby removing or peeling the sheet of frozen confection from the walls and depositing it in the receptacle below.

The locking pin may then be removed, the funnel loaded with a new charge of confection mixture, and the process repeated.

The design of the lower face of the pistons will determine the form in which the confection is deposited. One feature of the piston common to all the forms here illustrated, is a circular concave recess 38 in the piston face nut 30, beginning just inside the cutting edge 29 and extending inwardly to a point adjacent the nozzle recess. The frozen sheet of confection is directed into a circular path by the contour of the recess and the removed sheet is wound upon itself to form substantially cylindrical rolls.

As the diameter of the sleeve is larger than the diameter of the rolled material, I have found that attempts to make large rolls, using the recess 28 alone are generally unsatisfactory, owing to the fact that the crowding of the rolled material in the interior of the cylinder tends to break up the mass before it can assume large proportions. I therefore prefer to provide means on the piston face for splitting the cylindrical frozen sheet into longitudinal strips so that at least a substantial portion of the removed confection will be deposited in rolls of substantial size, each roll having a plurality of convolutions.

All of the pistons here illustrated show splitting studs 39 placed in the area of the recess 38. While I have illustrated the use of four studs, the number may be changed to give any desired design of finished product as deposited in the receptacle.

In Figures 3 and 4 the splitting studs have been designed to split the frozen material into four wide strips and four narrow ones. The stud faces 40 are here designed to give the narrow strips a different curvature than the wide ones, and to allow the wide strips to be deposited practically unbroken in the receptacle. The narrow strips having a sharper curvature are more liable to break, and do so while the wider strips are being rolled. The result of the removal action of the piston shown in Figures 4 and 5 is shown in Figures 12 and 13 in which the four large rolls 41 formed by the normal curvature of the recess 38 are surrounded by the broken fragments 42 of the rolls formed by the faces 40 of the studs 39.

Figures 6 and 7 show a piston giving a very narrow strip between four wider ones, and Figures 8 and 9 show splitting studs which eliminate the narrow strips entirely and merely split the cylindrical sheet into four wide strips, the faces being designed to compact the rolls at the ends and thus prevent the ends from breaking during the roll formation. The texture of the sheet is such that considerable deformation can take place in the peeled curl before it will fracture, and it is this latitude which enables a cylindrical roll to be formed in each quadrant, even though peeled from a curved surface.

All of the above described deposits have been made with the receptacle placed sufficiently below the end of the piston stroke so that the piston will not compress the deposited material. I may desire to serve the confection in the rolled form, an example of which is shown in Figure 12. I may prefer, however, to mould the deposit by compressing the removed material between the lower face of the piston and the receptacle. In this case I adjust the receptacle support 36 until the receptacle 37 is tight against the lower opening of the cylinder. The piston, in its downward travel, first peels and forms the frozen material, deposits it in the receptacle and then continues down a short distance until the deposited material is compressed between the lower piston face and the receptacle. The imprint or mould of the lower piston surface is left on the top of the deposited material and the rolls are flattened. Figure 10 shows a receptacle having the deposit moulded by pressure from the piston illustrated in Figure 3. The upper surface 43 of the confection shows the complete imprint of the piston. Figure 11 illustrates how the final action of the piston is to consolidate and mould the upper surface and flatten the rolls.

There is a difference in taste between the rolled product and the rolled product moulded, as the product when mou'ded after being rolled is more solid and hard than is the product when in roll form. People may express their preference and be accommodated simply by changing the distance of the receptacle to the end point of the piston stroke to give a confection of greater or less consolidation.

The quality of the product is due to several factors. Fruit juices, water ices, etc., are as smooth as the finest creams, although not as rich. This smoothness is due to the fact that the crystals are exceedingly minute and that the material is deposited in thin adherent layers. But the æsthetic value of the product is beyond the mere construction of the deposited sheet. A thin unconsolidated sheet has no eye value, nor is it susceptible to service without consolidation. Here I show several stages of consolidation, each of them having a different eye and taste appeal, due to the massing of the product. First, the broken fragments, second, the loosely consolidated roll formed by the curling process, and third, the compact moulded product formed by flattening the rolls and removing most of the air spaces, yet none of these forms taste like confections frozen by the ordinary agitation method.

The external appearance of the product as served is of course subject to almost infinite variation. Combinations of piston faces and splitting studs will give varying patterns to both the rolled and moulded deposits. Trade-names or other distinctive markings are easily moulded on the product, a convenient surface for the die being the lower surface of the nozzle 23 shown here flat and unmarked.

Other features may be pointed out. The piston, entering the cylinder only once during the making of an individual serving, rests at the top of the sleeve during the freezing process and when the machine is idle, thus helping to insulate the sleeve. The receptacle performs the same function at the bottom of the sleeve, thus preventing excess refrigeration cost. The piston, being exposed to room temperatures, is kept sufficiently warm to allow the frozen material to slip easily over the recess surface without sticking thereto.

I claim:

1. The method of making a confection which comprises freezing a thin sheet of a confection mixture, and forming said sheet into a roll in which the convolutions of said roll are non-adherent.

2. The method of making a confection which comprises freezing a thin sheet of a confection mixture, forming said sheet into a substantially cylindrical roll, depositing said roll in a receptacle and pressing said roll between said receptacle and a form to mould a surface of said roll.

3. Means for freezing a confection mixture comprising in combination a cylinder having a smooth inner surface, said surface being adapted to be cooled below the freezing point of said mixture, means for spraying said mixture on said surface to form a cylindrical flexible layer thereon, means for removing said layer comprising a piston having a cutting edge adapted to be inserted between said layer and said surface, means for supporting a receptacle at one end of said cylinder, and means for pushing said piston through said cylinder to remove said layer and to compress the removed confection between said piston and said container receptacle.

4. Means for freezing a confection mixture comprising in combination a cylinder having a smooth inner surface, said surface being adapted to be cooled below the freezing point of said mixture, means for spraying said mixture on said surface to form a cylindrical flexible layer thereon, means for removing said layer comprising a piston having a cutting edge adapted to be inserted between said layer and said surface, means for pushing said piston through said cylinder to remove said layer, and means on the surface of said piston for splitting the removed material into a plurality of longitudinal strips.

5. Means for freezing a confection mixture comprising in combination a cylinder having a smooth inner surface, said surface being adapted to be cooled below the freezing point of said mixture, means for spraying said mixture on said surface to form a cylindrical flexible layer thereon, means for removing said layer comprising a piston having a cutting edge adapted to be inserted between said layer and said surface, a concave surface cooperating with said edge adapted to curl the removed material, and means for pushing said piston through said cylinder to remove said layer.

6. Means for freezing a confection mixture comprising in combination a cylinder having a smooth inner surface, said surface being adapted to be cooled below the freezing point of said mixture, means for spraying said mixture on said surface to form a cylindrical flexible layer thereon, means for removing said layer comprising a piston having a cutting edge adapted to be inserted between said layer and said surface, a concave surface cooperating with said edge adapted to curl the removed material, means for pushing said piston through said cylinder to remove said layer, and means mounted on said concave surface for splitting the removed material into longitudinal strips.

7. Means for freezing a confection mixture comprising in combination a cylinder having a smooth inner surface, said surface being adapted to be cooled below the freezing point of said mixture, means for spraying said mixture on said surface to form a cylindrical flexible layer thereon, means for removing said layer comprising a piston having a cutting edge adapted to be inserted between said layer and said surface, a concave surface cooperating with said edge adapted to curl the removed material, means for pushing said piston through said cylinder to remove said layer, and means mounted on said concave surface for dividing the removed material into wide and narrow longitudinal strips, said curved surface forming the wide strips into rolls.

8. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for traversing said inner surface with said nozzle so that a fine spray of unfrozen confection may be deposited on substantially the entire area of said inner surface, a piston having an edge adapted to remove said deposit, said shaft passing freely through said piston, and means for fastening said piston to said shaft to cause said piston to traverse said inner surface.

9. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for traversing said inner surface with said nozzle so that a fine spray of unfrozen confection may be deposited on substantially the entire area of said inner surface, a piston having a peripheral cutting edge for removing said material and a lower surface having a circular concave recess cut therein adjacent said cutting edge for directing the removed material, said shaft normally passing freely through said piston, and means for locking said piston to said shaft to cause said piston to traverse said inner surface.

10. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for traversing said inner surface with said nozzle so that a fine spray of unfrozen confection may be deposited on substantially the entire area of said inner surface, a piston having a peripheral cutting edge for removing said material and a lower surface having a circular concave recess cut therein adjacent said cutting edge for directing the removed material into a roll, means positioned around said recess for splitting the removed material into a plurality of rolls, and means for attaching said piston to said shaft to cause said piston to traverse said inner surface.

11. Means for making frozen confections comprising a cylinder having an inner surface adapted to be cooled, means for cooling said surface, a motor having a hollow shaft, a container for unfrozen confection at one end of said shaft, a centrifugal spray nozzle at the other end of said shaft, means for inserting said nozzle in said cylinder, means for traversing said inner surface with said nozzle so that a fine spray of unfrozen confection may be deposited on substantially the entire area of said inner surface, means for adjustably supporting a receptacle below said cylinder, a piston adapted to remove said deposit and having a recess therein to receive said nozzle, said shaft normally passing freely through said piston, and means for fastening said piston and said nozzle together to cause said piston to traverse said inner surface and to compress the removed material between the lower surface of the piston and said container, thereby leaving the imprint of the combined piston and nozzle surface on the surface of said confection.

12. The method of making a confection which comprises freezing a thin sheet of a confection mixture, splitting said sheet into strips, and simultaneously forming said strips into a plurality of symmetrically arranged rolls.

13. The method of making a confection which comprises freezing a thin sheet of a confection mixture, splitting said sheet into strips, simultaneously forming said strips into a plurality of rolls, and depositing said rolls in symmetrical arrangement.

14. The method of making a confection which comprises freezing a thin sheet of a confection mixture, forming said sheet into a roll in which the convolutions of said roll are non-adherent, and compressing said roll to consolidate the material of said roll.

15. In combination, means for freezing a confection mixture comprising a cylinder having a smooth inner surface, said surface being adapted to be cooled below the freezing point of said mixture, a shaft located in the axis of said cylinder, a spray nozzle on the end of said shaft, means for simultaneously spraying unfrozen material from said nozzle to said inner wall and reciprocating said shaft and nozzle along the longitudinal axis of said cylinder to deposit a layer of confection on said inner wall, a piston having a peripheral cutting edge fitting said inner surface positioned at one end of said cylinder, said piston being apertured to permit free passage of said shaft therethrough during the reciprocation of said shaft and nozzle, and means for connecting said piston to said shaft at the top of said stroke to remove said layer during the subsequent downward stroke.

16. In combination, means for freezing a confection mixture comprising a cylinder having a smooth inner surface, said surface being adapted to be cooled below the freezing point of said mixture, a shaft located in the axis of said cylinder, a spray nozzle on the end of said shaft, means for simultaneously spraying unfrozen material from said nozzle to said inner wall and reciprocating said shaft and nozzle along the longitudinal axis of said cylinder to deposit a layer of confection on said inner wall, a piston having a peripheral cutting edge fitting said inner surface positioned at one end of said cylinder, said piston being apertured to permit free passage of said shaft therethrough during the reciprocation of said shaft and nozzle, and means for connecting said piston to said shaft at the top of said stroke to remove said layer during the subsequent downward stroke, said latter means being releasable when the piston is returned to its original position.

17. In combination, means for freezing a confection mixture comprising a cylinder having a smooth inner surface, said surface being adapted to be cooled below the freezing point of said mixture, a shaft located in the axis of said cylinder, a spray nozzle on the end of said shaft, means for simultaneously spraying unfrozen material from said nozzle to said inner wall and reciprocating said shaft and nozzle along the longitudinal axis of said cylinder to deposit a layer of confection on said inner wall, a piston having a peripheral cutting edge fitting said inner surface positioned at one end of said cylinder, said piston being apertured to permit free passage of said shaft therethrough during the reciprocation of said shaft and nozzle, the combination of said piston and shaft providing an effective closure for the top of said cylinder, means for connecting said piston to said shaft at the top of said stroke to remove said layer during the subsequent downward stroke, and a receptacle forming an effective closure for the opposite end of said cylinder to receive the removed confection.

18. The method of making a confection which comprises freezing a thin sheet of a confection mixture, splitting said sheet into strips, and curling said strips to form a design.

19. The method of making a confection which comprises freezing a thin sheet of a confection mixture, splitting said sheet into strips, and curling said strips to form a symmetrical mass.

20. The method of making a confection which comprises freezing a thin sheet of confection mixture, splitting said sheet into strips, and forming said strips into a plurality of symmetrically arranged adjacent masses.

21. The method of making a confection which comprises freezing a thin sheet of confection mixture, splitting said sheet into strips, forming said strips into a plurality of symmetrically arranged adjacent masses, and applying a consolidating pressure to said masses.

22. The method of making a confection which comprises freezing a thin cylindrical sheet of confection mixture, progressively splitting said sheet into strips parallel to the axis of said cylinder, and concurrently curling said sheets inwardly to form a plurality of symmetrically arranged adjacent masses.

23. The method of making a confection mixture which comprises freezing a sheet of confection mixture, progressively curling said sheet from one end to the other to form curved strips of varying extent, and covering said strips with a final substantially continuous curved portion of said strips.

ERNEST E. LINDSEY.

DISCLAIMER 2,025,757.—*Ernest E. Lindsey*, San Francisco, Calif. FROZEN CONFECTION AND METHOD OF MAKING. Patent dated December 31, 1935. Disclaimer filed April 2, 1938, by the patentee; the assignee, *Insta-Freeze Corporation*, consenting and approving.

Hereby enters this disclaimer to claim 1 of said Letters Patent.
[*Official Gazette April 26, 1938.*]